(12) United States Patent
Caram et al.

(10) Patent No.: US 12,056,378 B1
(45) Date of Patent: Aug. 6, 2024

(54) STORAGE MANAGEMENT SYSTEM AND METHOD

(71) Applicant: Dell Products L.P., Round Rock, TX (US)

(72) Inventors: Bruce E. Caram, Hudson, MA (US); Vamsi K. Vankamamidi, Hopkinton, MA (US); Alexei Karaban, Northborough, MA (US); Henry A. Spang, IV, Bristol, RI (US); Ajay Karri, South Grafton, MA (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/160,732

(22) Filed: Jan. 27, 2023

(51) Int. Cl.
G06F 12/00 (2006.01)
G06F 3/06 (2006.01)

(52) U.S. Cl.
CPC ............ *G06F 3/064* (2013.01); *G06F 3/0604* (2013.01); *G06F 3/067* (2013.01)

(58) Field of Classification Search
CPC ......... G06F 3/064; G06F 3/0604; G06F 3/067
See application file for complete search history.

(56) References Cited

U.S. PATENT DOCUMENTS

| | | | | |
|---|---|---|---|---|
| 10,108,517 B1 * | 10/2018 | Efremov | ............... | G06F 16/122 |
| 11,163,496 B1 * | 11/2021 | Armangau | ............ | G06F 3/0653 |
| 2003/0221060 A1 * | 11/2003 | Umberger | ............. | G06F 3/0689 |
| | | | | 711/161 |
| 2007/0033330 A1 * | 2/2007 | Sinclair | ................ | G06F 3/0608 |
| | | | | 711/E12.008 |
| 2010/0005222 A1 * | 1/2010 | Brant | ..................... | G06F 3/0631 |
| | | | | 711/6 |
| 2010/0306445 A1 * | 12/2010 | Dake | ..................... | G06F 3/0631 |
| | | | | 718/1 |
| 2014/0052953 A1 * | 2/2014 | Ben-Tsion | ............ | G06F 3/0605 |
| | | | | 711/172 |
| 2014/0297987 A1 * | 10/2014 | Garson | ................ | G06F 3/0631 |
| | | | | 711/170 |
| 2016/0269239 A1 * | 9/2016 | Ashby, Jr. | ........... | H04L 43/0876 |
| 2017/0031622 A1 * | 2/2017 | Nagarajan | ............. | G06F 3/0607 |
| 2018/0032268 A1 * | 2/2018 | Barndt | ................. | G06F 3/0679 |
| 2020/0241758 A1 * | 7/2020 | Patel | ..................... | G06F 3/0644 |
| 2020/0409599 A1 * | 12/2020 | Liguori | ................ | G06F 3/0604 |
| 2022/0414102 A1 * | 12/2022 | Shatsky | ............ | G06F 16/24552 |

* cited by examiner

*Primary Examiner* — Shawn X Gu
*Assistant Examiner* — Mohammad S Hasan
(74) *Attorney, Agent, or Firm* — Brian J. Colandreo; Heath M. Sargeant; Holland & Knight LLP (57) ABSTRACT

A method, computer program product, and computing system for tracking the utilization of a plurality of PLBs within a storage platform to generate PLB utilization information, wherein each PLB is associated with one or more VLBs; and tracking the utilization of the one or more VLBs associated with each of the plurality of PLBs within the storage platform to generate VLB utilization information.

18 Claims, 6 Drawing Sheets

STORAGE MANAGEMENT SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible.

Unfortunately, as the storage system is being utilized, various discrete portions of storage known as PLBs (i.e., Physical Large Blocks) may become partially filed as inbound data is written to them. This may result in the inefficient use of the storage system. However, being VLBs (i.e., Virtual Large Blocks) are often utilized to virtualize storage space within the PLBs, it is often difficult to consolidate partially utilized PLBs.

SUMMARY OF DISCLOSURE

In one implementation, a computer-implemented method is executed on a computing device and includes: tracking the utilization of a plurality of PLBs within a storage platform to generate PLB utilization information, wherein each PLB is associated with one or more VLBs; and tracking the utilization of the one or more VLBs associated with each of the plurality of PLBs within the storage platform to generate VLB utilization information.

One or more of the following features may be included. The utilization of the PLBs and the utilization of the VLBs may be tracked at different levels of granularity. Two or more lower-utilized PLBs may be consolidated to form one or more higher-utilized PLB. Consolidating two or more lower-utilized PLBs to form one or more higher-utilized PLBs may include: obtaining the VLB utilization information associated with at least one of the lower-utilized PLBs, thus defining obtained VLB utilization information; and consolidating the two or more lower-utilized PLBs to form one or more higher-utilized PLBs based, at least in part, upon the obtained VLB utilization information. Consolidating the two or more lower-utilized PLBs to form one or more higher-utilized PLBs based, at least in part, upon the obtained VLB utilization information may include: reassociating at least one VLB initially associated with a first of the two or more lower-utilized PLBs to a second of the two or more lower-utilized PLBs; wherein the second of the two or more lower-utilized PLBs forms one of the higher-utilized PLBs. Consolidating the two or more lower-utilized PLBs to form one or more higher-utilized PLBs based, at least in part, upon the obtained VLB utilization information may include: reassociating at least one VLB initially associated with a first of the two or more lower-utilized PLBs with a target PLB; and reassociating at least one VLB initially associated with a second of the two or more lower-utilized PLBs with the target PLB; wherein the target PLB forms one of the higher-utilized PLBs. Each PLB may be a 2.0 megabyte portion of the storage platform.

In another implementation, a computer program product resides on a computer readable medium and has a plurality of instructions stored on it. When executed by a processor, the instructions cause the processor to perform operations including tracking the utilization of a plurality of PLBs within a storage platform to generate PLB utilization information, wherein each PLB is associated with one or more VLBs; and tracking the utilization of the one or more VLBs associated with each of the plurality of PLBs within the storage platform to generate VLB utilization information.

One or more of the following features may be included. The utilization of the PLBs and the utilization of the VLBs may be tracked at different levels of granularity. Two or more lower-utilized PLBs may be consolidated to form one or more higher-utilized PLB. Consolidating two or more lower-utilized PLBs to form one or more higher-utilized PLBs may include: obtaining the VLB utilization information associated with at least one of the lower-utilized PLBs, thus defining obtained VLB utilization information; and consolidating the two or more lower-utilized PLBs to form one or more higher-utilized PLBs based, at least in part, upon the obtained VLB utilization information. Consolidating the two or more lower-utilized PLBs to form one or more higher-utilized PLBs based, at least in part, upon the obtained VLB utilization information may include: reassociating at least one VLB initially associated with a first of the two or more lower-utilized PLBs to a second of the two or more lower-utilized PLBs; wherein the second of the two or more lower-utilized PLBs forms one of the higher-utilized PLBs. Consolidating the two or more lower-utilized PLBs to form one or more higher-utilized PLBs based, at least in part, upon the obtained VLB utilization information may include: reassociating at least one VLB initially associated with a first of the two or more lower-utilized PLBs with a target PLB; and reassociating at least one VLB initially associated with a second of the two or more lower-utilized PLBs with the target PLB; wherein the target PLB forms one of the higher-utilized PLBs. Each PLB may be a 2.0 megabyte portion of the storage platform.

In another implementation, a computing system includes a processor and memory is configured to perform operations including tracking the utilization of a plurality of PLBs within a storage platform to generate PLB utilization information, wherein each PLB is associated with one or more VLBs; and tracking the utilization of the one or more VLBs associated with each of the plurality of PLBs within the storage platform to generate VLB utilization information.

One or more of the following features may be included. The utilization of the PLBs and the utilization of the VLBs may be tracked at different levels of granularity or each PLB may be a 2.0 megabyte portion of the storage platform. Two or more lower-utilized PLBs may be consolidated to form one or more higher-utilized PLB. Consolidating two or more lower-utilized PLBs to form one or more higher-utilized PLBs may include: obtaining the VLB utilization information associated with at least one of the lower-utilized PLBs, thus defining obtained VLB utilization information; and consolidating the two or more lower-utilized PLBs to form one or more higher-utilized PLBs based, at least in part, upon the obtained VLB utilization information. Consolidating the two or more lower-utilized PLBs to form one or more higher-utilized PLBs based, at least in part, upon the obtained VLB utilization information may include: reassociating at least one VLB initially associated with a first of the two or more lower-utilized PLBs to a second of the two or more lower-utilized PLBs; wherein the second of the two or more lower-utilized PLBs forms one of the higher-utilized PLBs. Consolidating the two or more lower-utilized PLBs to form one or more higher-utilized PLBs based, at least in part, upon the obtained VLB utilization information may include: reassociating at least one VLB initially associated with a first of the two or more lower-utilized PLBs with a target PLB; and reassociating at least one VLB initially associated with a second of the two or more lower-utilized PLBs with the target PLB; wherein the target PLB forms one of the higher-utilized PLBs.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
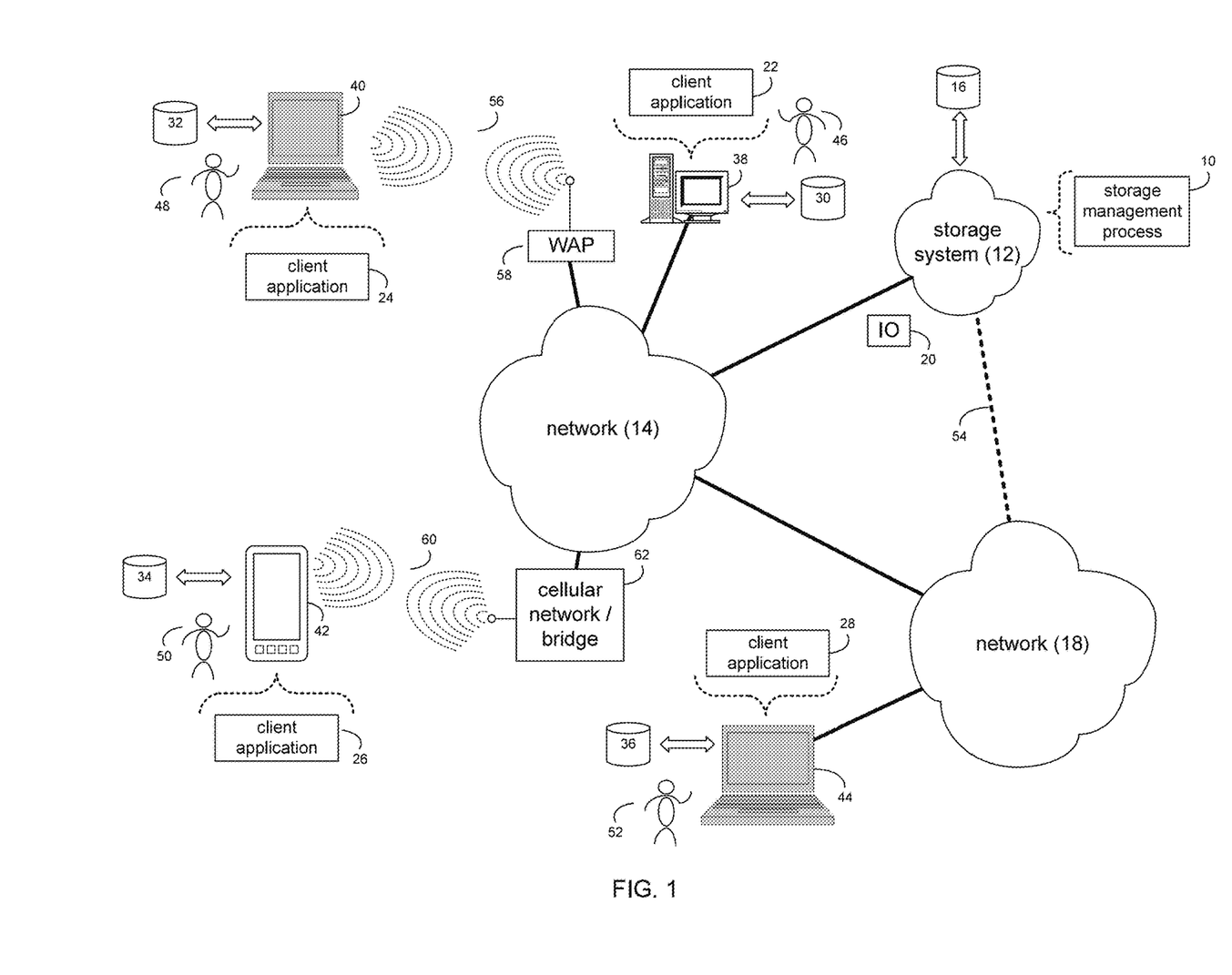
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
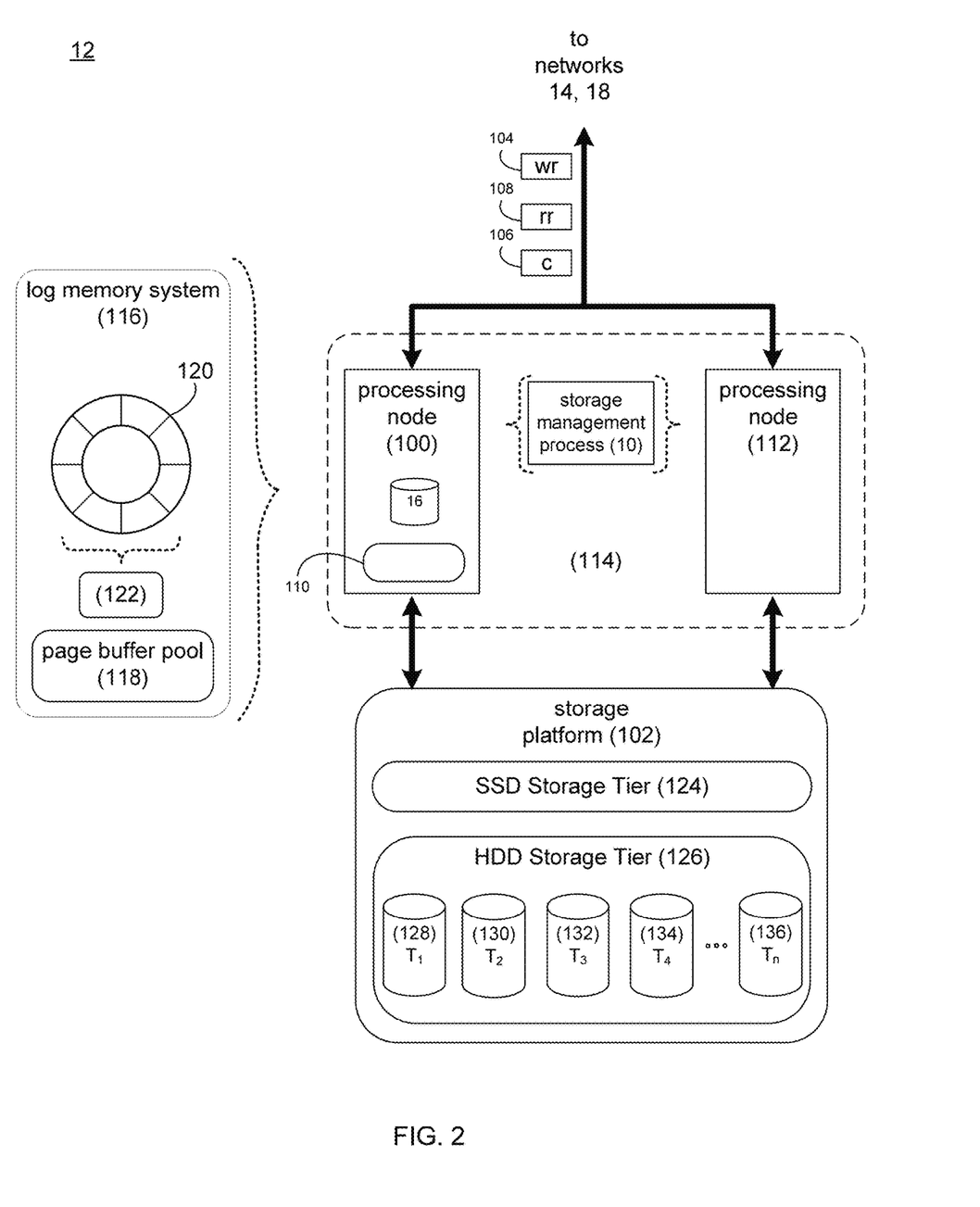
FIG. 2 is a diagrammatic view of the storage system of FIG. 1.

The Data Storage System:

Referring also to FIG. 2, there is shown a general implementation of storage system 12. In this general implementation, storage system 12 may include processing node 100, wherein processing node 100 may be configured to perform computational tasks and to store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability. Further, storage platform 102 may be a cloud-based storage platform that provides virtualized storage functionality to (in this example) users 46, 48, 50, 52.

As is known in the art, cloud storage is a model of computer data storage in which the digital data is stored in logical pools, said to be on "the cloud". The physical storage spans multiple servers (sometimes in multiple locations) and the physical environment is typically owned and managed by a hosting company. These cloud storage providers are responsible for keeping the data available and accessible, and the physical environment secured, protected, and running. People and organizations buy or lease storage capacity from the providers to store user, organization, or application data. Cloud storage services may be accessed through a collocated cloud computing service, a web service application programming interface (API) or by applications that use the API, such as cloud desktop storage, a cloud storage gateway or Web-based content management systems.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100. Storage device 16 may include but is not limited to: a hard disk drive; a RAID device; a random-access memory (RAM); a read-only memory (ROM); and all forms of flash memory storage devices.

As discussed above, various 10 requests (e.g., 10 request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e., a request that content 106 be written to storage system 12) and data read request 108 (i.e., a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112).

In some implementations, storage system 12 may include multi-node active-active storage clusters configured to provide high availability to a user. As is known in the art, the term "high availability" may generally refer to systems or components that are durable and likely to operate continuously without failure for a long time. For example, an active-active storage cluster (e.g., computing cluster 114) may be formed from at least two nodes (e.g., processing nodes 100, 112), both actively running the same kind of service(s) simultaneously. One purpose of an active-active cluster (e.g., computing cluster 114) may be to achieve load balancing. Load balancing may distribute workloads across all nodes in order to prevent any single node from getting overloaded. Because there are more nodes available to serve, there will also be a marked improvement in throughput and response times. Another purpose of an active-active cluster (e.g., computing cluster 114) may be to provide at least one active node in the event that one of the nodes in the active-active cluster fails.

Log-Based Storage System:

Storage system 12 may be configured as a log-based storage system. If so configured, storage management process 10 may store received data in a log memory system (e.g., log memory system 116). As is known in the art, a log memory system (e.g., log memory system 116) may generally include one or more non-volatile random-access memory (NVRAM) devices configured to store a log of the data written to storage system 12.

As discussed above, an example of IO request 20 may include but is not limited to data write request 104 (i.e., a request that content 106 be written to storage system 12). Further and as discussed above, upon receiving data write request 104 and content 106, data write request 104 and content 106 may be written to cache memory system 110 (which may be volatile). However and when configured as a log-based storage system, upon receiving data write request 104 and content 106, data write request 104 and/or content 106 may also be written to log memory system 116 (which is persistent).

Therefore and through the use of log memory system 116, the content of cache memory system 110 (e.g., data write request 104 and content 106) may be recovered (via log memory system 116) in the event of a power failure and/or a failure of cache memory system 110. Further and due to such failure recoverability, data (e.g., content 106) may be considered to be persistently stored (i.e., as if stored in storage platform 102) once such data (e.g., content 106) is saved within log memory system 116. Therefore, once such data (e.g., content 106) is saved within log memory system 116, a write acknowledgement may be provided to the sender of data write request 104, acknowledging the successful saving of such data (e.g., content 106), wherein such data (e.g., content 106) may be subsequently written to storage platform 102.

Log memory system 116 may include a page buffer pool (e.g., page buffer pool 118) and/or a page descriptor ring buffer (e.g., page descriptor ring buffer 120) to effectuate the above-described temporary storage of (in this example) content 106. For example, storage management process 10 may store one or more pages (associated with content 106) in one or more page buffers within page buffer pool 118 based, at least in part, upon the processing of (in this example) write request 104. Further, storage management process 10 may store information concerning the data (e.g., content 106) stored within log memory system 116 in a page descriptor (e.g., page descriptor 122), wherein page descriptor 122 may generally include a reference (i.e., a pointer) to the related page buffer(s) within page buffer pool 118. Page descriptor 122 may also include a sequence transaction number that tracks the order of write operations and/or other types of information.

Storage management process 10 may store each page descriptor (e.g., page descriptor 122) in a page descriptor ring buffer (e.g., page descriptor ring buffer 120). As is known in the art, a page descriptor ring buffer may allow data to be added to the "head" of the page descriptor ring buffer and released or overwritten from the tail of the page descriptor ring buffer. Accordingly, page descriptor ring buffer 120 may appear to be circular in that older data is overwritten with newer data as data (e.g., content 106) is moved from page buffer pool 118 to storage platform 102.

Backend Storage Platform

Storage system 12 may utilize both types of media (e.g., hard disk drives and solid-state devices) to provide a high level of performance at an acceptable price point. Specifically, storage platform 102 within storage system 12 may be a multi-tier storage platform that includes multiple storage tiers of different storage types. For example, storage platform 102 within storage system 12 may include an SSD storage tier (e.g., SSD storage tier 124) and an HDD storage tier (e.g., HDD storage tier 126).

HDD storage tier 126 may include a plurality of storage targets $T_{1-n}$ (e.g. storage targets 128, 130, 132, 134, 136). Storage targets 128, 130, 132, 134, 136 may be configured to provide various levels of performance and/or high availability. For example, one or more of storage targets 128, 130, 132, 134, 136 may be configured as a RAID 0 array, in which data is striped across storage targets. By striping data across a plurality of storage targets, improved performance may be realized. However, RAID 0 arrays do not provide a level of high availability. Accordingly, one or more of storage targets 128, 130, 132, 134, 136 may be configured as a RAID 1 array, in which data is mirrored between storage targets. By mirroring data between storage targets, a level of high availability is achieved as multiple copies of the data are stored within storage system 12.

While storage targets 128, 130, 132, 134, 136 are discussed above as being configured in a RAID 0 or RAID 1 array, this is for illustrative purposes only and is not intended to be a limitation of this disclosure, as other configurations are possible. For example, storage targets 128, 130, 132, 134, 136 may be configured as a RAID 3, RAID 4, RAID 5 or RAID 6 array. While in this particular example, HDD storage tier 126 is shown to include five storage targets (e.g. storage targets 128, 130, 132, 134, 136), this is for illustrative purposes only and is not intended to be a limitation of this disclosure. Specifically, the actual number of storage targets may be increased or decreased depending upon e.g., the level of redundancy/performance/capacity required.

Figure 3:
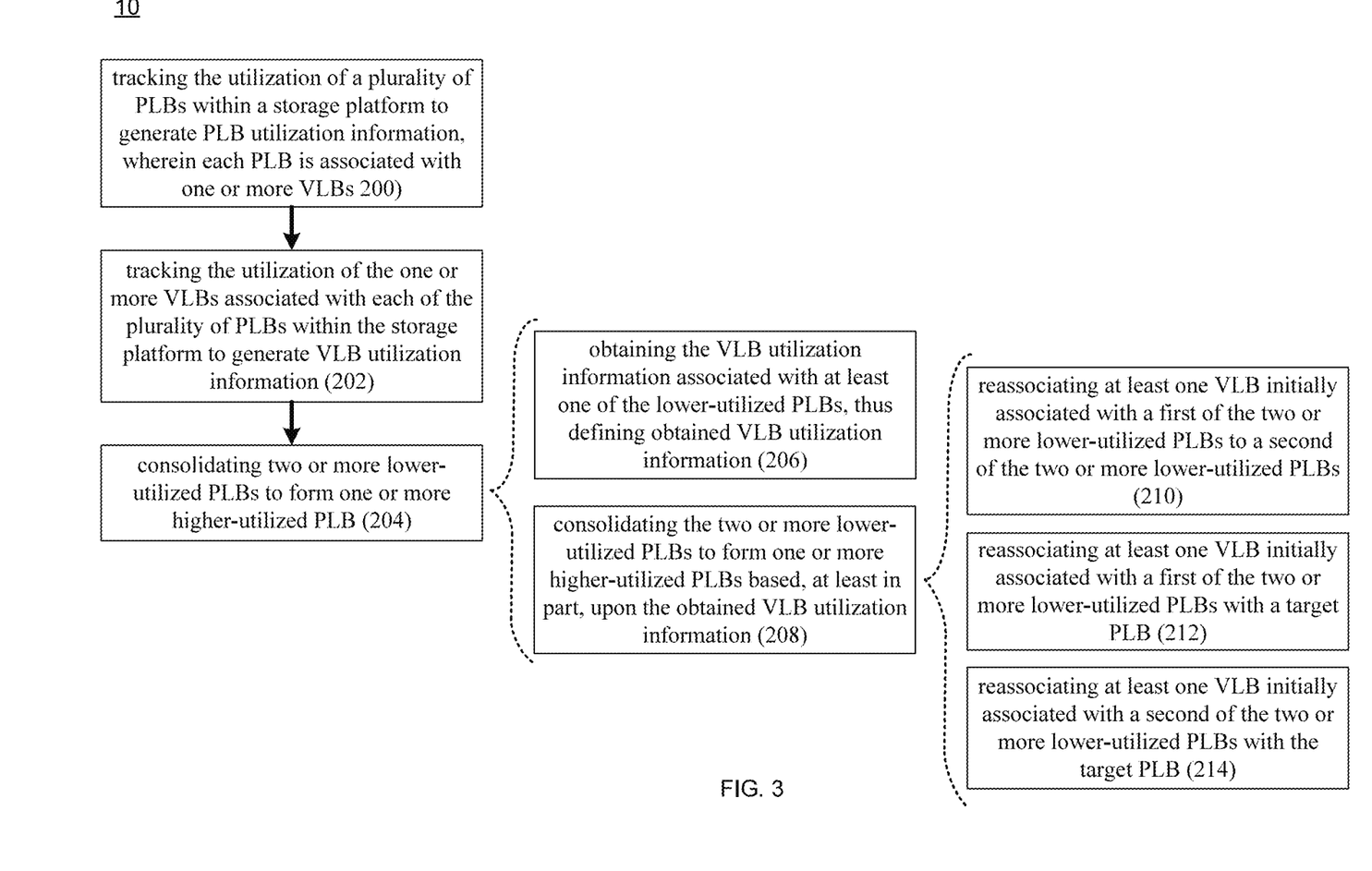
FIG. 3 is a flow chart of the storage management process of FIG. 1.
Figure 4:
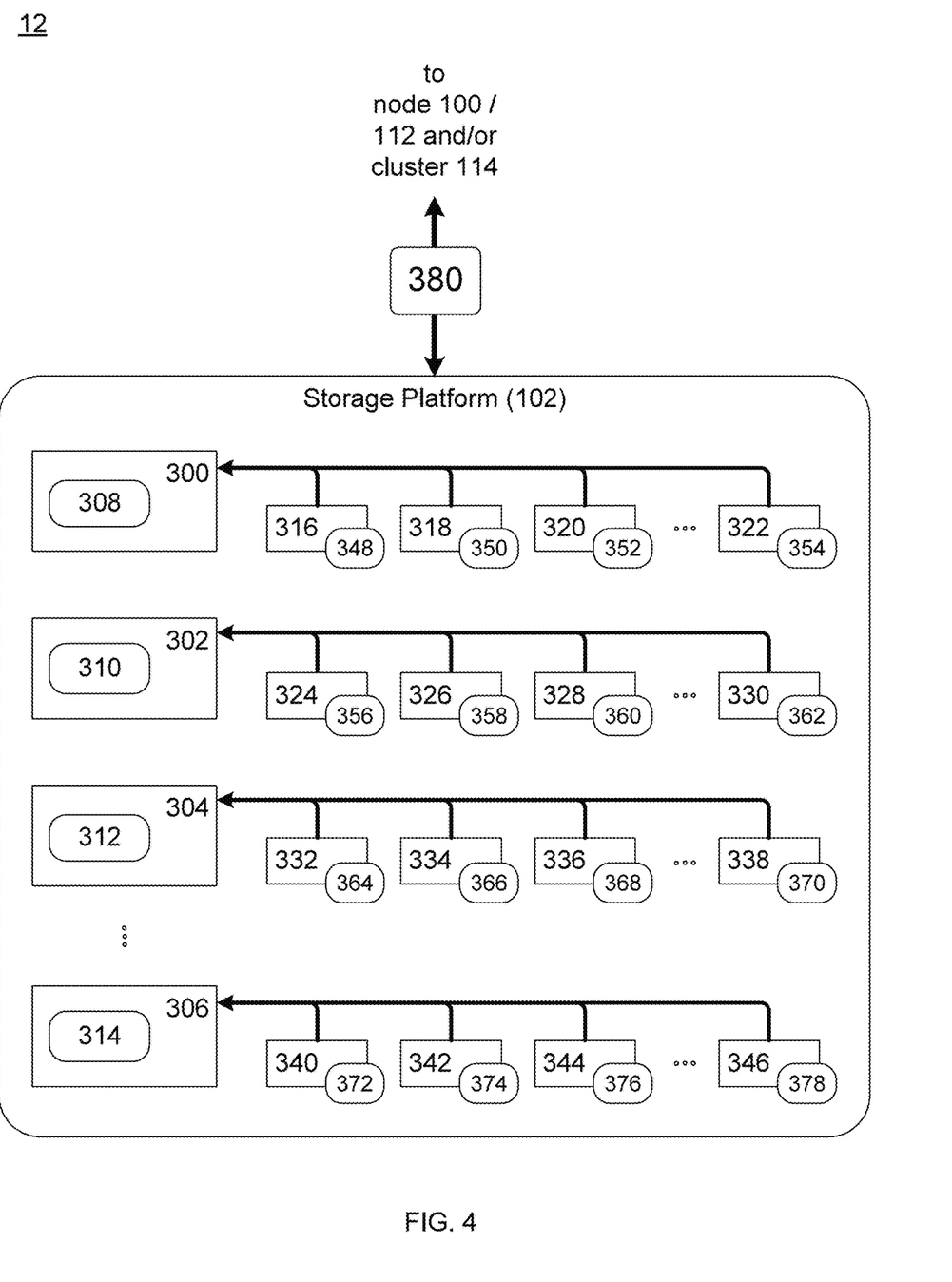
FIG. 4 is another diagrammatic view of the storage system of FIG. 1.

Storage Management Process:

Referring also to FIGS. 3-4, storage management process 10 may track 200 the utilization of a plurality of PLBs (e.g., PLBs 300, 302, 304, 306) within a storage platform (e.g., storage platform 102) to generate PLB utilization information (e.g., PLB utilization information 308, 310, 312, 314 respectively).

As is known in the art, a PLB (i.e., Physical Large Block) is a physical portion of storage within a storage platform (e.g., storage platform 102). While four PLBs (e.g., PLBs 300, 302, 304, 306) are shown in this example, this is for illustrative purposes only and is not intended to be a limitation of this disclosure, as other configurations are possible and are considered to be within the scope of this disclosure. For example, a PLB may be a 2.00 megabyte portion of the storage platform (e.g., storage platform 102). So if storage platform 102 includes 20.00 terabytes of storage, storage platform 102 may include ten million PLBs.

PLB utilization information (e.g., PLB utilization information 308, 310, 312, 314) may define that current level of utilization of a particular PLB. For example, PLB utilization information 308 may define the current level of utilization of PLB 300; PLB utilization information 310 may define the current level of utilization of PLB 302; PLB utilization information 312 may define the current level of utilization of PLB 304; and PLB utilization information 314 may define the current level of utilization of PLB 306. Such PLB utilization information (e.g., PLB utilization information 308, 310, 312, 314) may define the percentage of a PLB that is currently being utilized. So if PLB 300 is a 2.00 megabyte PLB and has 0.50 megabytes of data stored on it, its utilization may be 25%; and if PLB 304 is a 2.00 megabyte PLB and has 1.60 megabytes of data stored on it, its utilization may be 80%.

Such PLB utilization information (e.g., PLB utilization information 308, 310, 312, 314) may specify the current level of utilization of a particular PLB in a defined level of granularity (e.g., increments of 10%), wherein a "0" may represent a 0% utilization, a "1" may represent a 1-10% utilization, a "2" may represent a 11-20% utilization, a "3" may represent a 21-30% utilization, a "4" may represent a 31-40% utilization, a "5" may represent a 41-50% utilization, a "6" may represent a 51-60% utilization, a "7" may represent a 61-70% utilization, a "8" may represent a 71-80% utilization, a "9" may represent a 81-90% utilization, and a "10" may represent a 91-100% utilization Each PLB (e.g., PLBs 300, 302, 304, 306) may be associated with one or more VLBs. As is known in the art, a VLB (i.e., Virtual Large Block) is a virtual portion of memory that is mapped to a physical portion of memory (e.g., a PLB) within a storage platform (e.g., storage platform 102).

For example:
PLB 300 may be associated with VLBs 316, 318, 320, 322, wherein VLBs 316, 318, 320, 322 may be used by client applications 22, 24, 26, 28 to virtually store data that is physically stored within PLB 300;
PLB 302 may be associated with VLBs 324, 326, 328, 330, wherein VLBs 324, 326, 328, 330 may be used by client applications 22, 24, 26, 28 to virtually store data that is physically stored within PLB 302;
PLB 304 may be associated with VLBs 332, 334, 336, 338, wherein VLBs 332, 334, 336, 338 may be used by client applications 332, 334, 336, 338 to virtually store data that is physically stored within PLB 304; and
PLB 306 may be associated with VLBs 340, 342, 344, 346, wherein VLBs 340, 342, 344, 346 may be used by client applications 22, 24, 26, 28 to virtually store data that is physically stored within PLB 306.

While four VLBs are shown in this example to be associated with each PLB (e.g., each of PLBs 300, 302, 304, 306), this is for illustrative purposes only and is not intended to be a limitation of this disclosure, as other configurations are possible and are considered to be within the scope of this disclosure. For example, the quantity of VLBs associated with each PLB (e.g., each of PLBs 300, 302, 304, 306) may be increased or decreased depending upon e.g., the level of compression of each PLB/VLB. For example, eight 2.00 megabyte VLBs may be associated with each 2.00 megabyte PLB if 8× compression is utilized; while four 2.00 megabyte VLBs may be associated with each 2.00 megabyte PLB if 4× compression is utilized.

Storage management process 10 may track 202 the utilization of the one or more VLBs (e.g., VLBs 316, 318, 320, 322, 324, 326, 328, 330, 332, 334, 336, 338, 340, 342, 344, 346) associated with each of the plurality of PLBs (e.g., PLBs 300, 302, 304, 306) within the storage platform (e.g., storage platform 102) to generate VLB utilization information. Generally speaking, VLB utilization may map with respect to the maximum size of a PLB. For example, assume that a PLB is 75% utilized and this PLB is associated with three VLBs. Accordingly, if $VLB_1$ has a utilization of 50%, $VLB_2$ has utilization of 10% and $VLB_3$ has a utilization of 15%, the sum of the utilization of these three VLBs (i.e., $VLB_1$, $VLB_2$, $VLB_3$) is 75% (the same as the utilization of the associated PLB).

For example,

VLB utilization information 348, 350, 352, 354 may define the current level of utilization of VLBs 316, 318, 320, 322 respectively;

VLB utilization information 356, 358, 360, 362 may define the current level of utilization of VLBs 324, 326, 328, 330 respectively;

VLB utilization information 364, 366, 368, 370 may define the current level of utilization of VLBs 332, 334, 336, 338 respectively; and VLB utilization information 372, 374, 376, 378 may define the current level of utilization of VLBs 340, 342, 344, 346 respectively.

Such VLB utilization information (e.g., VLB utilization information 348, 350, 352, 354, 356, 358, 360, 362, 364, 366, 368, 370, 372, 374, 376, 378) may specify the current level of utilization of a particular VLB in a defined level of granularity (e.g., increments of 5%), Accordingly, the utilization of the PLBs (e.g., PLB utilization information 308, 310, 312, 314) and the utilization of the VLBs (e.g., VLB utilization information 348, 350, 352, 354, 356, 358, 360, 362, 364, 366, 368, 370, 372, 374, 376, 378) may be tracked at different levels of granularity (e.g., 10% increments versus 5% increments).

During the operation of storage system 12, data (e.g., data 380) may be written to storage platform 102 after being received from processing node 100, processing node 112 and/or computing cluster 114. As discussed above, the storage system (e.g., storage system 12) may be a log-based storage system that includes log memory system 116 having one or more non-volatile random-access memory (NVRAM) devices configured to store a log of the data written to storage system 12. Accordingly and during operation of such a log-based system, this data (e.g., data 380) is routinely "flushed" from log memory system 116 to storage platform 102. Upon arriving at storage platform 102, this data (e.g., data 380) may be stored within storage platform 102 and the various PLBs (e.g., PLBs 300, 302, 304, 306) included therein.

Typically, storage platform 102 may store arriving data (e.g., data 380) in unused PLBs/VLBs, thus generating a large quantity of partially filled PLBs/VLBs during the operation of storage system 12. Accordingly and for maintenance reasons, storage management process 10 may consolidate 204 two or more lower-utilized PLBs to form one or more higher-utilized PLB. For example, storage management process 10 may review PLB utilization information of each of PLBs 300, 302, 304, 306 to identify potential candidates for PLB consolidation.

Assume that storage management process 10 identifies two PLBs that are each 50% utilized (namely PLBs 300, 302). Accordingly, storage management process 10 may consolidate 204 these two lower-utilized PLBs to form one or more higher-utilized PLB (in this case, a 100% utilized PLB) and an unused (e.g., 0% utilized) PLB. Unfortunately and as discussed above, PLB utilization may be tracked at a granularity of 10%. And as discussed above, a utilization of "5" may represent a 41-50% utilization. Accordingly, if two PLBs (e.g., PLBs 300, 302) have a utilization of "5", their combined utilization may be as high as 100% (if both 50%) or may be as low as 82% (if both 41%).

However and as discussed above, VLB utilization may be tracked at a higher level of granularity, namely 5%. Accordingly and when consolidating 204 two or more lower-utilized PLBs to form one or more higher-utilized PLBs, storage management process 10 may obtain 206 the VLB utilization information associated with at least one of the lower-utilized PLBs, thus defining obtained VLB utilization information.

For this example, assume that PLB 300 has PLB utilization information 308 of "5" (i.e., a 41-50% utilization) and has one VLB associated with it (e.g., VLB 316), wherein VLB 316 has a utilization level of 45% (as defined within VLB utilization information 348). Further, assume that PLB 302 has PLB utilization information 310 of "5" (i.e., a 41-50% utilization) and has one VLB associated with it (e.g., VLB 324), wherein VLB 324 has a utilization level of 50% (as defined within VLB utilization information 356).

Accordingly, if storage management process 10 relied solely on PLB utilization information when deciding which lower-utilized PLBs to consolidate 204 to form one or more higher-utilized PLBs, the predicted utilization of the higher-utilized PLB would be 82-100% (for the reasons discussed above). However, being PLB 300 has VLB 316 associated with it, which has a utilization level of 45% (as defined within VLB utilization information 348) and PLB 302 has VLB 324 associated with it, which has a utilization level of 50% (as defined within VLB utilization information 356), a higher resolution prediction may be made concerning the utilization of the higher-utilized PLB. So even if a VLB utilization level of 45% represents a utilization level in the range of 41-45% and a VLB utilization level of 50% represents a utilization level in the range of 46-50%, if storage management process 10 relies on VLB utilization information when deciding which lower-utilized PLBs to consolidate 204 to form one or more higher-utilized PLBs, the predicted utilization of the higher-utilized PLB would be 87-95% (for the reasons discussed above).

Accordingly and when consolidating 204 two or more lower-utilized PLBs to form one or more higher-utilized PLBs, storage management process 10 may consolidate 208 the two or more lower-utilized PLBs to form one or more higher-utilized PLBs based, at least in part, upon the obtained VLB utilization information (in this case, VLB utilization information 348, 356).

Internal Consolidation of PLBs:

As will be discussed below in greater detail, when consolidating 208 two or more lower-utilized PLBs to form one or more higher-utilized PLBs based, at least in part, upon the obtained VLB utilization information, storage management process 10 may reassociate 210 at least one VLB initially associated with a first of the two or more lower-utilized PLBs to a second of the two or more lower-utilized PLBs. In this configuration, the second of the two or more lower-utilized PLBs forms one of the higher-utilized PLBs.

As discussed above and referring also to FIG. 5, PLB 300 has VLB 316 associated with it, which has a utilization level of 45% (as defined within VLB utilization information 348) and PLB 302 has VLB 324 associated with it, which has a utilization level of 50% (as defined within VLB utilization information 356). Accordingly, storage management process 10 may reassociate 210 VLB 316 initially associated with a first of the two or more lower-utilized PLBs (e.g., PLB 300) to a second of the two or more lower-utilized PLBs (e.g., PLB 302). In this configuration, the second of the two or more lower-utilized PLBs (e.g., PLB 302) forms one of the higher-utilized PLBs. And in the event that the data within PLB 302 is cold data, PLB 302 may be "downtiered" to e.g., HDD storage tier 126.

Figure 5:
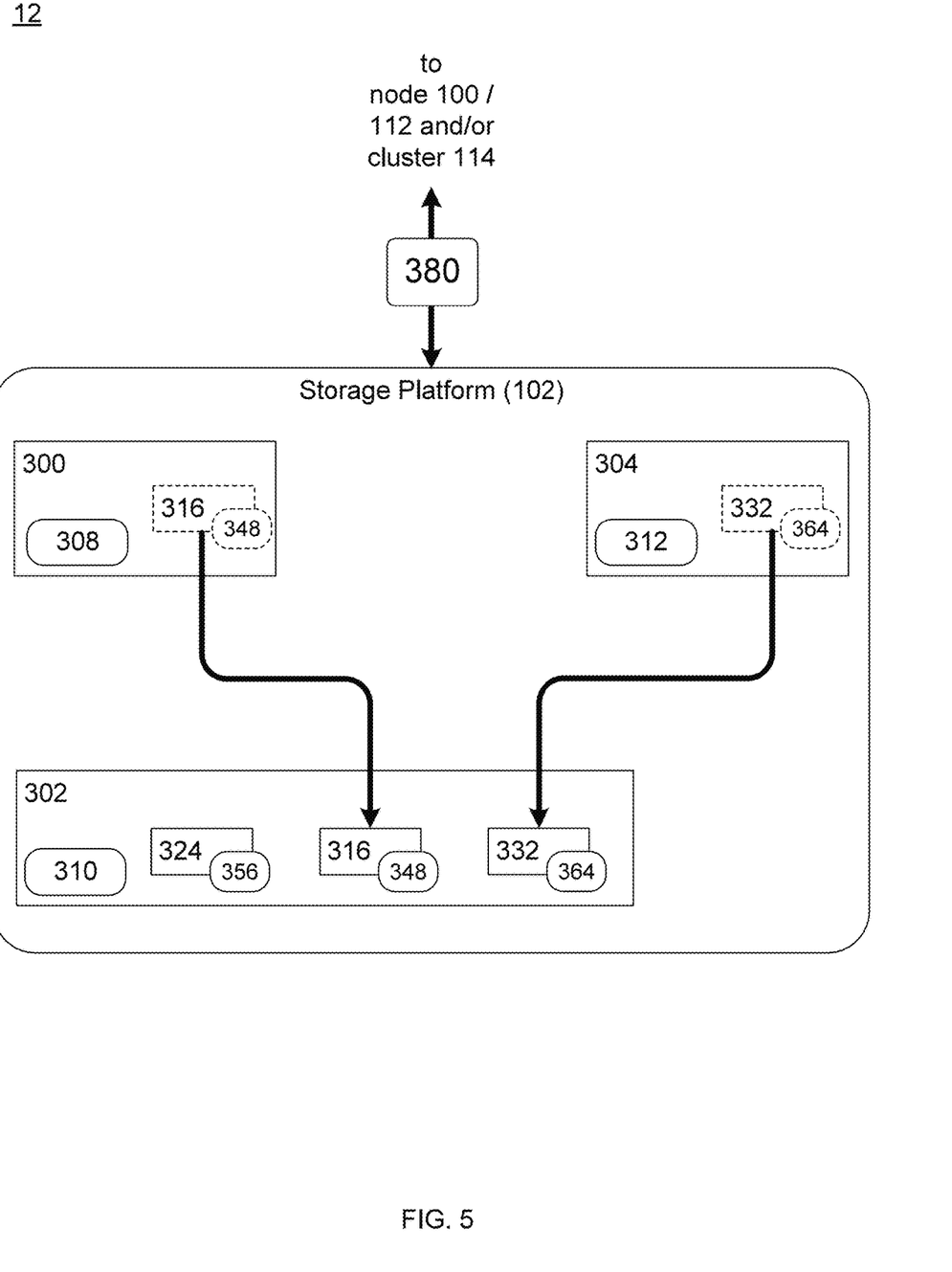
FIG. 5 is another diagrammatic view of the storage system of FIG. 1.

As discussed above, the predicted utilization of the higher-utilized PLB (e.g., PLB 302) would be 87-95%. Accordingly, if PLB 304 has VLB 332 associated with it, which has a utilization level of 5% (as defined within VLB utilization information 364), storage management process 10 may reassociate VLB 332 initially associated with PLB 304 to PLB 302, thus further enhancing the utilization of PLB 302.

External Consolidation of PLBs:

As will be discussed below in greater detail, when consolidating 208 the two or more lower-utilized PLBs to form one or more higher-utilized PLBs based, at least in part, upon the obtained VLB utilization information, storage management process 10 may reassociate 212 at least one VLB initially associated with a first of the two or more lower-utilized PLBs with a target PLB and may reassociate 214 at least one VLB initially associated with a second of the two or more lower-utilized PLBs with the target PLB. In this configuration, the target PLB forms one of the higher-utilized PLBs.

As discussed above and referring also to FIG. 6, PLB 300 has VLB 316 associated with it, which has a utilization level of 45% (as defined within VLB utilization information 348) and PLB 302 has VLB 324 associated with it, which has a utilization level of 50% (as defined within VLB utilization information 356). Accordingly, storage management process 10 may reassociate 212 VLB 316 initially associated with a first of the two or more lower-utilized PLBs (e.g., PLB 300) with a target PLB (e.g., PLB 306, which may be unused) and may reassociate 214 VLB 324 initially associated with a second of the two or more lower-utilized PLBs (e.g., PLB 302) with the target PLB (e.g., PLB 306). In this configuration, the target PLB (e.g., PLB 306) forms one of the higher-utilized PLBs. And in the event that the data within PLB 306 is cold data, PLB 306 may be "downtiered" to e.g., HDD storage tier 126.

Figure 6:
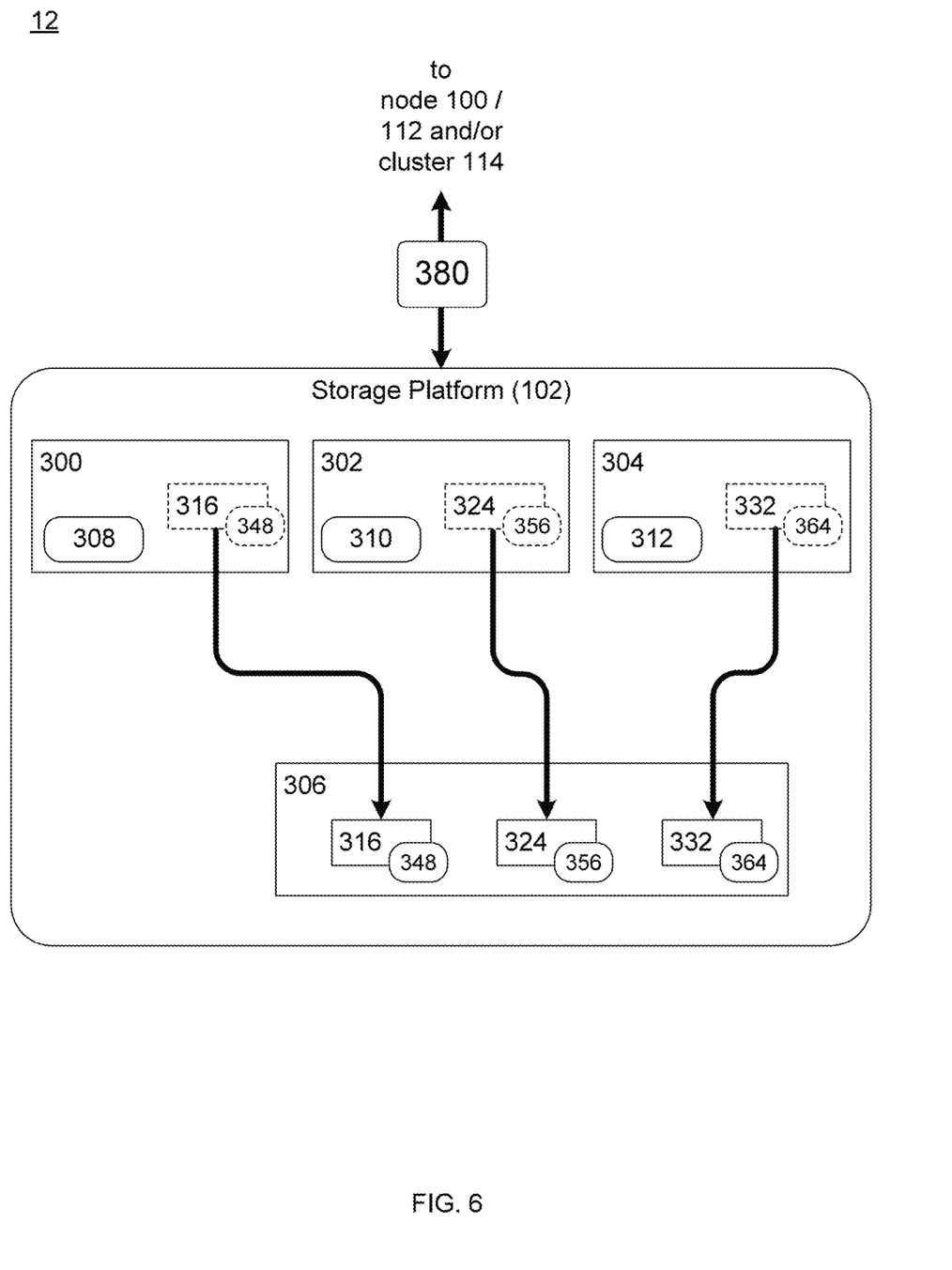
FIG. 6 is another diagrammatic view of the storage system of FIG. 1.

As discussed above, the predicted utilization of the higher-utilized PLB (e.g., PLB 306) would be 87-95%. Accordingly, if PLB 304 has VLB 332 associated with it, which has a utilization level of 5% (as defined within VLB utilization information 364), storage management process 10 may reassociate VLB 332 initially associated with PLB 304 to PLB 306, thus further enhancing the utilization of PLB 306.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device comprising:
   tracking the utilization of a plurality of PLBs within a storage platform to generate PLB utilization information, wherein each PLB is associated with one or more VLBs; and
   tracking the utilization of the one or more VLBs associated with each of the plurality of PLBs within the storage platform to generate VLB utilization information, wherein the utilization of the PLBs and the utilization of the VLBs are tracked at different levels of granularity.

2. The computer-implemented method of claim 1 further comprising:
   consolidating two or more lower-utilized PLBs to form one or more higher-utilized PLB.

3. The computer-implemented method of claim 2 wherein consolidating two or more lower-utilized PLBs to form one or more higher-utilized PLBs includes:
   obtaining the VLB utilization information associated with at least one of the lower-utilized PLBs, thus defining obtained VLB utilization information; and
   consolidating the two or more lower-utilized PLBs to form one or more higher-utilized PLBs based, at least in part, upon the obtained VLB utilization information.

4. The computer-implemented method of claim 3 wherein consolidating the two or more lower-utilized PLBs to form one or more higher-utilized PLBs based, at least in part, upon the obtained VLB utilization information includes:
   reassociating at least one VLB initially associated with a first of the two or more lower-utilized PLBs to a second of the two or more lower-utilized PLBs;
   wherein the second of the two or more lower-utilized PLBs forms one of the higher-utilized PLBs.

5. The computer-implemented method of claim 3 wherein consolidating the two or more lower-utilized PLBs to form one or more higher-utilized PLBs based, at least in part, upon the obtained VLB utilization information includes:
   reassociating at least one VLB initially associated with a first of the two or more lower-utilized PLBs with a target PLB; and
   reassociating at least one VLB initially associated with a second of the two or more lower-utilized PLBs with the target PLB;
   wherein the target PLB forms one of the higher-utilized PLBs.

6. The computer-implemented method of claim 1 wherein each PLB is a 2.0 megabyte portion of the storage platform.

7. A computer program product residing on a non-transitory computer readable medium having a plurality of instructions stored thereon which, when executed by a processor, cause the processor to perform operations comprising:
   tracking the utilization of a plurality of PLBs within a storage platform to generate PLB utilization information, wherein each PLB is associated with one or more VLBs; and
   tracking the utilization of the one or more VLBs associated with each of the plurality of PLBs within the storage platform to generate VLB utilization information, wherein the utilization of the PLBs and the utilization of the VLBs are tracked at different levels of granularity.

8. The computer program product of claim 7 further comprising:
   consolidating two or more lower-utilized PLBs to form one or more higher-utilized PLB.

9. The computer program product of claim 8 wherein consolidating two or more lower-utilized PLBs to form one or more higher-utilized PLBs includes:
 obtaining the VLB utilization information associated with at least one of the lower-utilized PLBs, thus defining obtained VLB utilization information; and
 consolidating the two or more lower-utilized PLBs to form one or more higher-utilized PLBs based, at least in part, upon the obtained VLB utilization information.

10. The computer program product of claim 9 wherein consolidating the two or more lower-utilized PLBs to form one or more higher-utilized PLBs based, at least in part, upon the obtained VLB utilization information includes:
 reassociating at least one VLB initially associated with a first of the two or more lower-utilized PLBs to a second of the two or more lower-utilized PLBs;
 wherein the second of the two or more lower-utilized PLBs forms one of the higher-utilized PLBs.

11. The computer program product of claim 9 wherein consolidating the two or more lower-utilized PLBs to form one or more higher-utilized PLBs based, at least in part, upon the obtained VLB utilization information includes:
 reassociating at least one VLB initially associated with a first of the two or more lower-utilized PLBs with a target PLB; and
 reassociating at least one VLB initially associated with a second of the two or more lower-utilized PLBs with the target PLB;
 wherein the target PLB forms one of the higher-utilized PLBs.

12. The computer program product of claim 7 wherein each PLB is a 2.0 megabyte portion of the storage platform.

13. A computing system including a processor and memory configured to perform operations comprising:
 tracking the utilization of a plurality of PLBs within a storage platform to generate PLB utilization information, wherein each PLB is associated with one or more VLBs; and
 tracking the utilization of the one or more VLBs associated with each of the plurality of PLBs within the storage platform to generate VLB utilization information, wherein the utilization of the PLBs and the utilization of the VLBs are tracked at different levels of granularity.

14. The computing system of claim 13 wherein each PLB is a 2.0 megabyte portion of the storage platform.

15. The computing system of claim 13 further comprising:
 consolidating two or more lower-utilized PLBs to form one or more higher-utilized PLB.

16. The computing system of claim 15 wherein consolidating two or more lower-utilized PLBs to form one or more higher-utilized PLBs includes:
 obtaining the VLB utilization information associated with at least one of the lower-utilized PLBs, thus defining obtained VLB utilization information; and
 consolidating the two or more lower-utilized PLBs to form one or more higher-utilized PLBs based, at least in part, upon the obtained VLB utilization information.

17. The computing system of claim 16 wherein consolidating the two or more lower-utilized PLBs to form one or more higher-utilized PLBs based, at least in part, upon the obtained VLB utilization information includes:
 reassociating at least one VLB initially associated with a first of the two or more lower-utilized PLBs to a second of the two or more lower-utilized PLBs;
 wherein the second of the two or more lower-utilized PLBs forms one of the higher-utilized PLBs.

18. The computing system of claim 16 wherein consolidating the two or more lower-utilized PLBs to form one or more higher-utilized PLBs based, at least in part, upon the obtained VLB utilization information includes:
 reassociating at least one VLB initially associated with a first of the two or more lower-utilized PLBs with a target PLB; and
 reassociating at least one VLB initially associated with a second of the two or more lower-utilized PLBs with the target PLB;
 wherein the target PLB forms one of the higher-utilized PLBs.

* * * * *